(12) United States Patent
Jackson et al.

(10) Patent No.: US 6,195,848 B1
(45) Date of Patent: Mar. 6, 2001

(54) SLIDABLE RATCHET TENSIONING DEVICE AND TIE-DOWN ASSEMBLY

(75) Inventors: Stephen D. Jackson, Stockton; James A. Headd, Herald, both of CA (US)

(73) Assignee: USA Products, Lodi, CA (US)

( * ) Notice: Subject to any disclaimer, the term of this patent is extended or adjusted under 35 U.S.C. 154(b) by 0 days.

(21) Appl. No.: 09/134,046

(22) Filed: Aug. 14, 1998

(51) Int. Cl.$^7$ ................................................. B65D 67/00
(52) U.S. Cl. ....................................... 24/68 CD; 24/698.1
(58) Field of Search ...................... 242/388.2; 254/217, 254/218, 223; 24/67 CD, 68 B, 909, 265 H, 199, 265 AL, 318, 321, 698.1, 698.3

(56) References Cited

U.S. PATENT DOCUMENTS

| | | | |
|---|---|---|---|
| 171,705 | * 1/1876 | Taber et al. | 24/909 X |
| 384,512 | * 6/1888 | Dillon | 24/265 H X |
| 482,035 | * 9/1892 | Buckingham | 24/909 X |
| 559,133 | 4/1896 | Holden . | |
| 621,081 | * 3/1899 | Hensley | 24/909 X |
| 799,767 | * 9/1905 | Weisenborn | 24/909 X |
| 2,363,138 | * 11/1944 | Moore . | |
| 2,557,499 | 6/1951 | Davis | 254/77 |
| 2,597,351 | * 5/1952 | MacKenzie | 24/68 B |
| 2,671,937 | * 3/1954 | Finke | 24/68 B |
| 3,826,473 | 7/1974 | Huber | 254/164 |
| 4,155,537 | 5/1979 | Bronson et al. | 254/164 |
| 4,185,360 | 1/1980 | Prete, Jr. et al. | 24/68 CD |
| 4,199,182 | 4/1980 | Sunesson | 254/79 |
| 4,268,012 | 5/1981 | Ruehle et al. | 254/223 |
| 4,510,652 | 4/1985 | van Iperen | 24/68 CD |
| 4,530,135 | * 7/1985 | Hsiang | 24/68 CD |
| 4,567,628 | * 2/1986 | Prete, Jr. et al. | 24/199 X |
| 4,823,443 | 4/1989 | Waters | 24/68 CD |
| 4,913,608 | 4/1990 | Royball | 410/103 |
| 5,282,296 | 2/1994 | Huang | 24/68 CD |
| 5,426,826 | * 6/1995 | Takimoto | 24/68 CD |

* cited by examiner

*Primary Examiner*—James R. Brittain
(74) *Attorney, Agent, or Firm*—Limbach & Limbach, LLP

(57) ABSTRACT

A strap tensioning device that uses ratchet means to wind up and secure a tension strap in a tensioned condition for securing loads for hauling or transport. The device is adapted to be moveable along the length of a tension strap prior to tensioning the strap and includes a slotted member having a guide slot through which the strap is threaded for facilitating movement of the device along the strap and to prevent the device from cocking or twisting away from the device when the device is actuated to tension the strap. A slidable hook for a tensioning strap is also provided for use with the tensioning device. The hook includes a guide clip that provides for a receiving slot through which the strap is also threaded. The receiving slot maintains the strap in alignment with the guide slot.

19 Claims, 3 Drawing Sheets

SLIDABLE RATCHET TENSIONING DEVICE AND TIE-DOWN ASSEMBLY

BACKGROUND OF THE INVENTION

1. Field of the Invention

The present invention relates to a tie-down assembly for tightening down and tensioning a strap for tying down and securing loads, and more particularly to a tie-down assembly that includes a tensioning device that uses ratchet means to wind up and secure a tensioning strap in a tensioned condition.

2. Description of the Related Art

Ratchet-type strap tensioning devices are well known for winding up tensioning straps and securing the straps in a tensioned condition to secure loads for hauling or transport. An example of such a device is disclosed in U.S. Pat. No. 4,185,360 to Prete, Jr. et al. and generally consists of a frame or base member and a lever arm which is moved relative to the frame that drives a ratchet mechanism that rotates a slotted reel through which the tensioning strap is thread, advancing the strap into a tensioned condition. Typical ratchet-type strap tensioning devices have one end of the frame secured in a fixed relationship to an anchor point, for example, by means of short piece of strap attached at one end of the frame with the other end fixed to a hook that is secured to the anchor point. A second hook fixed to a longer length of tensioning strap is then secured to a second anchor point and the strap is threaded through a slotted reel on the tensioning device. Rotation of the reel by means of the ratchet mechanism winds the strap into a tensioned condition and secures the load. A disadvantage of such a configuration is that the device cannot be relocated or repositioned along the length of the tensioning strap to facilitate easier operation of the device, as would be desirable for instance where the position of the anchor points results in awkward or confined spaces for ratcheting the device. Another disadvantage is that the device cannot be repositioned to better conform the device to the configuration of the secured load prior to tensioning the strap, as would be desirable, for example, when the configuration of the secured load presents a fragile or a non-planar surface near the anchor points that would lead to damage to the load were the tensioning device tightened down a that location.

Attempts have been made to provide a strap tensioning device that provides for movement of the device along the tensioning strap. U.S. Pat. No. 3,826,473 to Huber, discloses such a device. This device consists of a single frame structure that includes a reel for winding up a tension strap where the reel is driven by means of a torque wrench.

It would be advantageous to provide a tensioning device that is easily moveable along a tensioning strap and that also provides for ease of operation. Ideally, such a device will be of a configuration that provides for a minimum of wear on the tensioning strap during adjustment of the device along the strap prior to winding up the strap into a tensioned condition and that also ensures good control of the device during the winding up operation.

SUMMARY OF THE INVENTION

The present invention provides for such a device. In one aspect of the invention there is provided a strap tensioning device having a base member pivotably coupled to a handle member, a slotted reel for receiving a tensioning strap, a pair of ratchet wheels attached to the reel member, a locking plate mounted on the base member for engagement with the ratchet wheels, and a pawl mounted on the handle for engagement with the ratchet wheel. Movement of the handle away from the base member drives the ratchet wheels and reel to wind up the tensioning strap around the reel. The base member further includes a slotted member having a guide slot for receiving the tension strap that is aligned with the reel slot. In the preferred embodiment of the invention, a U-shaped pin forms the slotted member, the pin itself having one leg rotatably mounted between the arms of the base member and the other free end of the pin extending across the arms. The reel slot and guide slot are aligned to allow for ease of movement of the device along a tension strap thread through the slots which results in reduced frictional forces applied to the strap, thereby minimizing wear on the strap itself. Preferably, the alignment is parallel to the bottom edges of the frame member which are in contact with surface of the secured load during use of the device. Another advantage of the slotted member is that it provides reaction points both above and below the threaded strap. The dual reaction points restrain the device from cocking in directions perpendicular to the strap and twisting in directions away from the strap, thereby allowing for improved control of device while actuating the handle member to wind up the strap. In another aspect of the invention, the handle member can include notches that engage with the slotted member. In the preferred embodiment, the notches engage with the free end of the U-shaped guide pin, thereby securing the pin in a fixed position.

In yet another aspect of the invention, a tie-down assembly is provided that includes a strap tensioning device with the aforementioned features and a tensioning strap having a sliding hook for attachment to an anchor point that is moveable along the strap length. The hook includes a guide clip that provides for a narrow hook eye through which the strap can be threaded. The provision of the guide clip restrains the strap from twisting and helps keep the strap in even alignment as it is thread through the guide slot and slotted reel of the tensioning device itself. In this fashion, the guide clip helps to minimize wear and tear on the strap both as the device is positioned along the strap and as the device is activated to tighten down the strap in a tensioned condition.

DETAILED DESCRIPTION OF THE INVENTION

Figure 1:
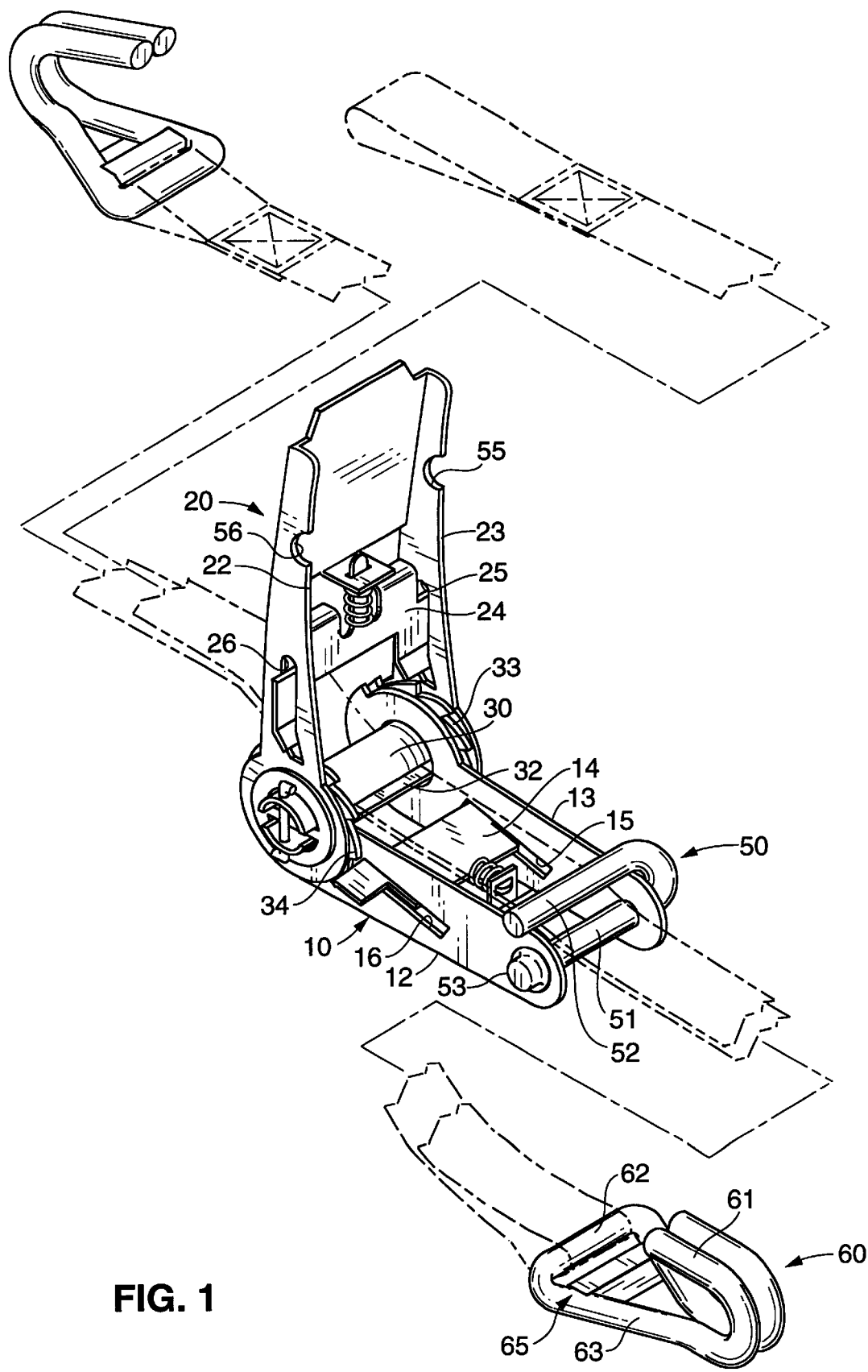
FIG. 1 is a perspective view of a tie-down assembly according to the present invention showing a strap tensioning device, a tensioning strap with part of the strap broken away, and securing hooks.
Figure 2:
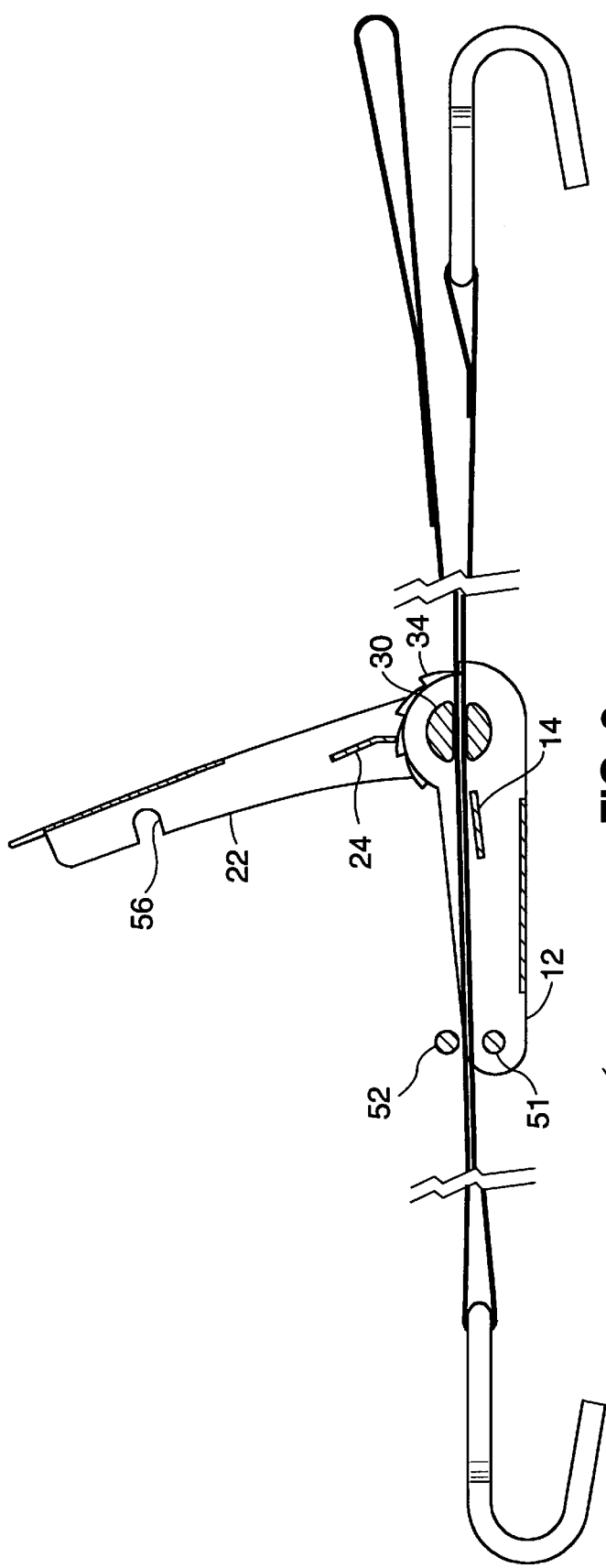
FIG. 2 is a vertical section view of the tie-down assembly of FIG. 1 illustrating the tensioning strap threaded through the tensioning device.
Figure 4:
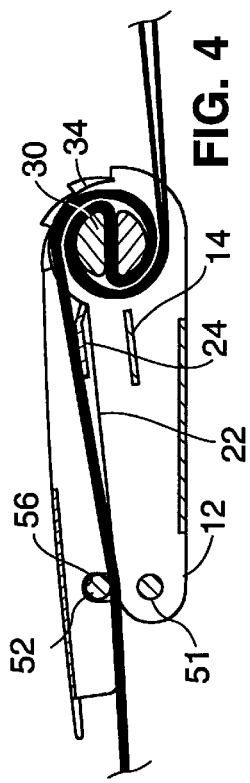
FIG. 4 is a vertical section view of the tie-down assembly of FIG. 2 illustrating the tensioning device with the tension strap in a wound up tensioned state.
Figure 3:
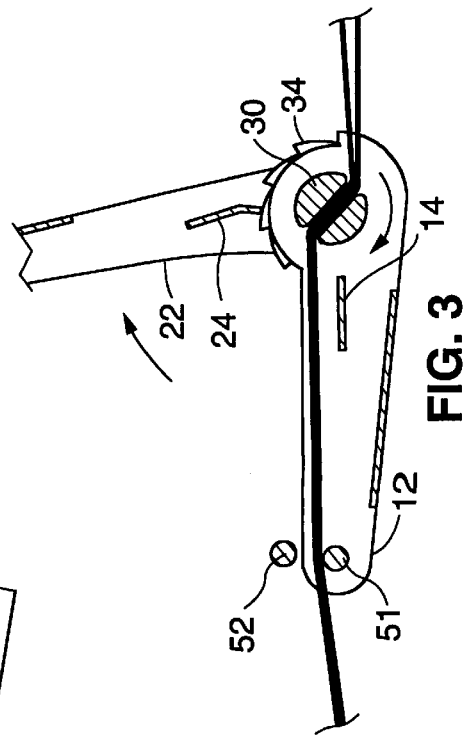
FIG. 3 is a vertical section view of the tie-down assembly of FIG. 2 illustrating the tensioning device in the condition of winding up the tensioning strap to impart tension on the strap.

A strap tensioning device according to the present invention is depicted in FIG. 1. The device includes a base member 10 having opposed parallel arms 12 and 13. Cylindrical reel member 30 is rotatably mounted on the base member between arms 12 and 13. The reel member 30 includes reel slot 32 for receiving a tensioning strap. The reel member is preferably formed of two hemicylindrical pieces having planar surfaces facing one another in a spaced apart relationship that define the reel slot, as depicted in FIGS. 2—4. Ratchet wheels 33 and 34 are mounted on the reel member in a fixed position relative to the reel member with base member arms 12 and 13 positioned between ratchet wheels 33 and 34. Locking plate 14 is slidably mounted between arms 12 and 13 in slots 15 and 16 for engagement with ratchet wheels 33 and 34. The locking plate is urged toward the ratchet wheels by resilient means such as a spring coil attached to the plate and the base member. Handle member 20 includes opposed parallel arms 22 and 23 rotatably mounted on reel member 30 with the ratchet wheels 33 and 34 and base member arms 12 and 13 between the handle member arms 22 and 23. Pawl 24 is slidably mounted between arms 22 and 23 in slots 25 and 26 for engagement with the ratchet wheels. The pawl is likewise urged toward the ratchet wheels by resilient means such as a spring coil attached to the pawl and the handle member.

In the preferred embodiment, the reel member 30 and ratchet wheels 33 and 34 are assembled and mounted onto the base and handle arms according to the ways disclosed in U.S. Pat. No. 5,282,296 to Huang, which is incorporated herein by reference.

Guide pin 50 is secured between base member arms 12 and 13 at the opposite end of the arms from the mounted reel member 30, as shown in FIGS. 1—4. The guide pin is U-shaped having opposable legs 51 and 52 that together with the base member arms define a guide slot between the legs. In the preferred embodiment, leg 51 passes through holes provided in arms 12 and 13 and end cap 53 is crimped onto the terminal end of leg 51 on the outer side of arm 13. Leg 51 remains free to rotate but is restricted from lateral movement toward arm 12 by end cap 53 and is restricted from lateral movement in the opposite direction by the bend in the guide pin that connects leg 51 to leg 52. Notches 55 and 56 are provided on the handle arms 23 and 22, respectively. The notches engage leg 51 when the handle member is moved toward the base member and secure leg 51 against movement relative to leg 52.

In operation, a tensioning strap having fixed hook 60 at one end is threaded through reel slot 32, guide slot and hook 60, and is then passed back through the guide slot and the reel slot, as depicted in FIG. 1—4. Movement of handle member 20 away from base member 10 drives the reel member 30 and the ratchet wheels 33 and 34, causing the tension strap to wind around the reel member, thus shortening the effective length of the strap between the two hooks and imparting tension to the strap.

As depicted in FIG. 2, the guide slot between pin legs 51 and 52 and the reel slot 32 are in alignment parallel to the bottom edges of base member arms 12 and 13. The alignment of the guide slot and reel slot is an important feature of the invention as it provides for smooth linear movement of the strap through the slots when the device is moved along the strap prior to tightening down the strap. The guide slot and reel slot are the only points of contact of the device with the strap during such positioning. The alignment feature thus provides an ease of operation in adjusting the device along the strap by reducing the friction imparted upon the strap during movement of the device along the strap. The minimal friction imparted on the strap further minimizes wear on the strap and prolongs the life of the strap.

Once the device is in the desired position for tensioning the strap, the guide pin legs 51 and 52 provide upper and lower reaction points above and below the threaded strap. The provision of these dual reaction points is another important feature of the invention as they restrain the end of base member 10 from cocking or twisting away from the tensioning strap as the user ratchets down the strap by operation of the handle member 20. As shown in FIG. 3, movement of the handle member away from the base member brings lower leg 51 into engagement with the tensioning strap and restrains the end of the base member from cocking away from the strap. In similar fashion, as can be seen in FIG. 4, when the handle member is moved back toward the base member, the strap engages upper pin 52. The engagement of the strap with pin 52 also prevents the cocking of the end of the base member away from the strap. In addition, pin 52 further maintains the strap between base member arms 12 and 13, thereby preventing the end of the base member from twisting away the strap. Such twisting, if allowed to occur, results in the device being at an angle relative to the strap length which disrupts the orientation of the strap as it is fed through the reel slot, making continued winding up of the strap around the reel difficult. When the strap is wound up and secured in a tensioned condition, notches 55 and 56 engage upper pin 52, locking pin 52 in place and providing additional stability to the device.

Figure 5:
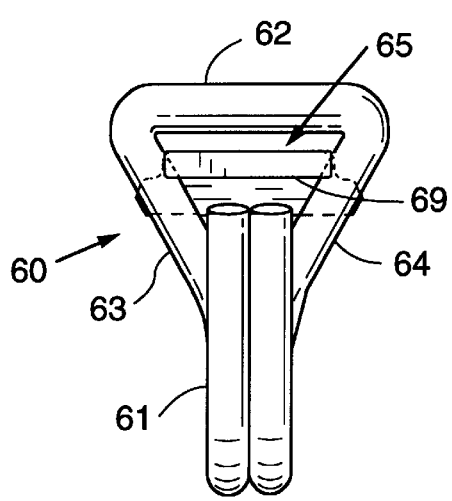
FIG. 5 is a front view of a securing hook according to the present invention.
Figure 6:
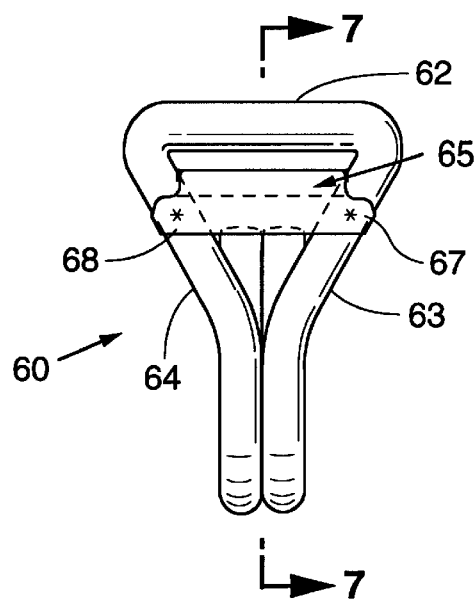
FIG. 6 is a back view of the securing hook of FIG. 5.
Figure 7:
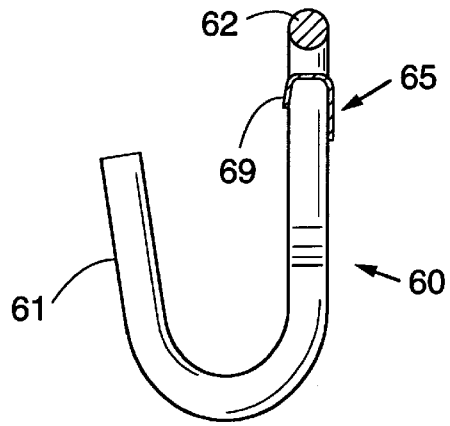
FIG. 7 is a cross-sectional view of the securing hook of FIG. 6 taken on the plane designated by line 7—7 of FIG. 6.
Figure 8:
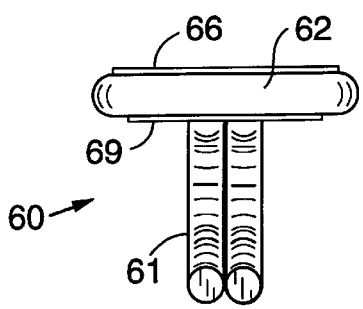
FIG. 8 is a bottom view of the securing hook of FIG. 5.
Figure 9:
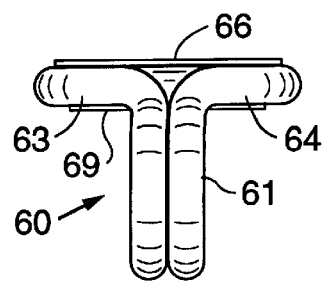
FIG. 9 is a top view of the securing hook of FIG. 5.

A slidable hook according to the present invention is shown in FIGS. 5—7 and can be used in combination with a tensioning strap and the strap tensioning device of the invention. The hook 60 is formed of a single piece, and includes an eye through which a tensioning strap is threaded. The eye is defined by top member 62, angled side members 63, 64 and guide clip 65. Remaining portion 61 of the hook extends from members 63 and 64. Guide clip 65 has an upper edge parallel to top member 62 that forms a narrow receiving slot that corresponds to the width of the strap. The guide clip includes lip 69 that extends from the clip along the front side of the hook and back portion 66 that extends from the clip along the back side of the hook. The guide clip is secured to the hook by flanges 67, 68 that extend from back portion 66 and that are welded to the back sides of angled side members 63 and 64. The tensioning strap is threaded through the receiving slot and the slot operates to restrain the threaded tension strap from twisting or otherwise moving in directions opposed to the linear alignment of the strap relative to the tensioning device. In this manner, ease of movement of the tensioning device along the strap and subsequent tensioning of the strap is facilitated.

Although only certain embodiments have been illustrated and described, those having ordinary skill in the art will understand that the invention is not limited to the specifics of these embodiments, but rather is defined by the accompanying claims.

What is claimed is:

1. A strap tensioning device adapted to be moveably slidable along a tensioning strap, said device comprising:
   a reel member having a reel slot for receiving the tensioning strap;
   a base member having opposable arms rotatably mounted on the reel member;
   a pair of ratchet wheels, each mounted on the reel member in a spaced apart relationship and between the base member arms;

a locking plate slidably mounted between the base member arms for engagement with the ratchet wheels;

a handle member having opposable arms rotatably mounted on the reel member for rotational movement toward and away from the base member;

a pawl slidably mounted between the handle arms for engagement with the ratchet wheels and which rotatably drive the ratchet wheels and reel member when the handle member is rotated away from the base member; and a slotted member having a guide slot extending between the base member arms for receiving the tension strap, the guide slot being generally rectilinear and oriented perpendicular to the base member arms.

2. The strap tensioning device of claim 1 wherein the slotted member comprises a U-shaped pin having first and second opposable legs that form the guide slot.

3. The strap tensioning device of claim 2 wherein the first pin leg is mounted between the base member arms and the second pin leg extends across the base member arms.

4. The strap tensioning device of claim 3 wherein the first pin leg is rotatably mounted between the base member arms.

5. The strap tensioning device of claim 3 wherein the handle member arms have notches that engage the second pin leg when the handle member is moved toward the base member.

6. The strap tensioning device of claim 1 wherein the base member arms have bottom edges and the guide slot and reel slot are aligned parallel to the bottom edges.

7. An improved strap tensioning device having a base member with arms pivotably coupled to a handle member with arms, a slotted reel member for receiving a tensioning strap a pair of ratchet wheels attached to the reel member, a locking plate mounted on the base member for engagement with the ratchet wheels, and a pawl mounted on the handle member for engagement with the ratchet wheel for rotably driving the ratchet wheels and reel member when the handle member is rotated away from the base member, the improvement comprising:

a slotted member having a guide slot extending between the base member arms for receiving the tension strap, the guide slot being generally rectilinear and oriented perpendicular to the base member arms.

8. The strap tensioning device of claim 7 wherein the slotted member comprises a U-shaped pin having first and second opposable legs that form the guide slot.

9. The strap tensioning device of claim 8 wherein the first pin leg is mounted between the base member arms and the second pin leg extends across the base member arms.

10. The strap tensioning device of claim 9 wherein the first pin leg is rotatably mounted between the base member arms.

11. The strap tensioning device of claim 9 wherein the handle member arms have notches which engage with the second pin leg when the handle member is moved toward the base member.

12. The strap tensioning device of claim 7 wherein the base member arms have bottom edges and the guide slot and reel slot are aligned parallel to the bottom edges.

13. An improved system for securing loads that includes a strap tensioning device adapted to be moveably slidable along a tensioning strap, the device having a base member pivotably coupled to a handle member with arms, a slotted reel member for receiving a tensioning strap, a pair of ratchet wheels attached to the reel member, a locking plate mounted on the base member for engagement with the ratchet wheels, and a pawl mounted on the handle for engagement with the ratchet wheel for rotably driving the ratchet wheels and reel member when the handle is rotated away from the base member, the improvement comprising:

a slotted member having a guide slot extending between the base member arms for receiving the tension strap, the guide slot being generally rectilinear and oriented perpendicular to the base member arms: and a hook for slidable attachment to the tension strap for securing the strap to a fixed anchor point, the hook having a top member, angled side members and a guide clip, the guide clip and top member forming a receiving slot that receives the tensioning strap.

14. The system of claim 13 wherein the guide clip further includes outward extending flanges attached to the angled side members.

15. The system of claim 13 wherein the slotted member comprises a U-shaped pin having first and second opposable legs that form the guide slot.

16. The system of claim 15 wherein the first pin leg is mounted between the base member arms and the second pin leg extends across the base member arms.

17. The system of claim 16 wherein the first pin leg is rotatably mounted between the base member arms.

18. The system of claim 16 wherein the handle member arms have notches which engage with the second pin leg when the handle member is moved toward the base member.

19. The system of claim 13 wherein the base member arms have bottom edges and the guide slot and reel slot are aligned parallel to the bottom edges.

\* \* \* \* \*